May 4, 1943.                P. DE MATTIA                2,318,065
                            HYDRAULIC DRIVE
                          Filed May 7, 1941
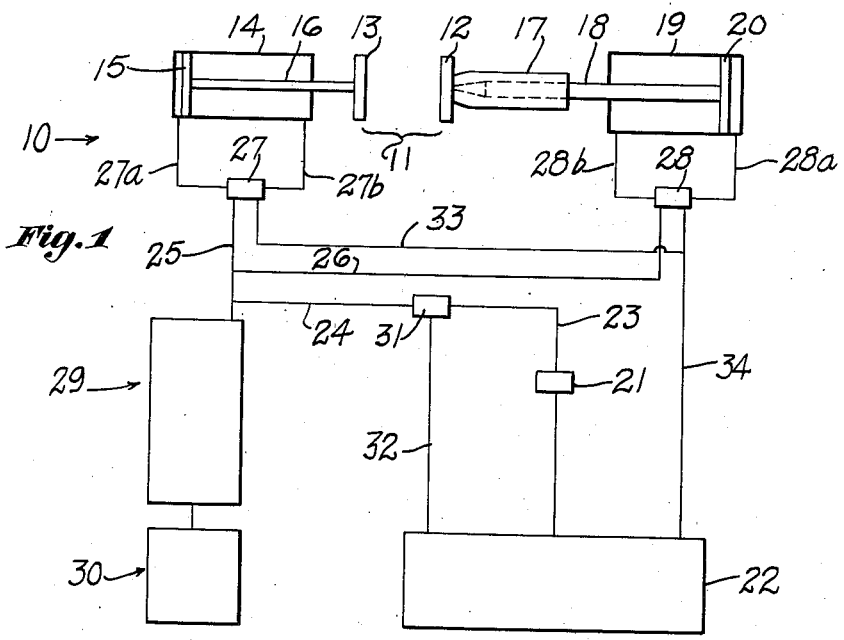
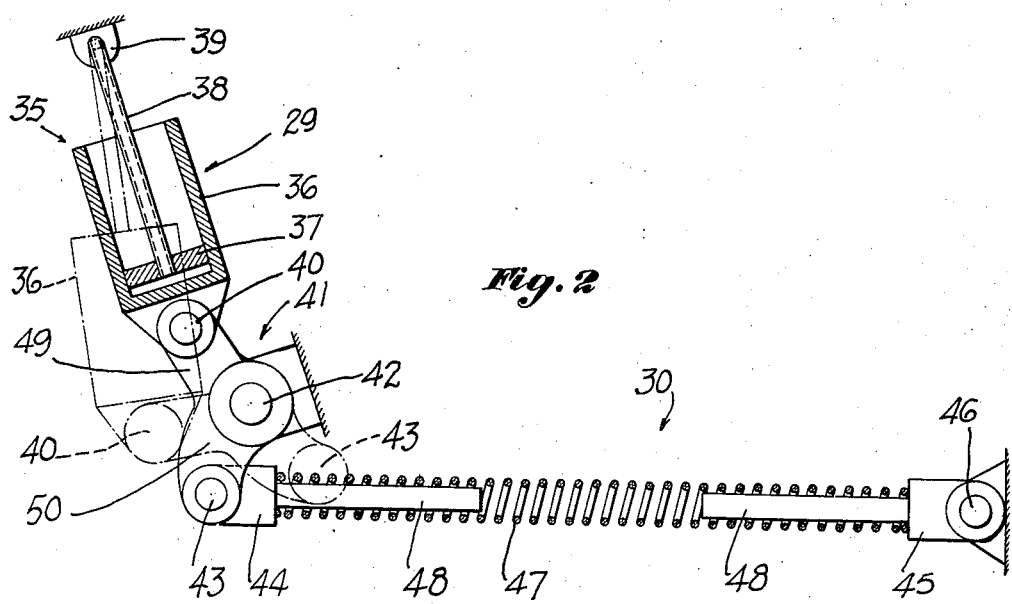
INVENTOR.
Peter De Mattia
BY
Louis Shumacher
ATTORNEY.

Patented May 4, 1943

2,318,065

UNITED STATES PATENT OFFICE 2,318,065

HYDRAULIC DRIVE

Peter De Mattia, Passaic, N. J.

Application May 7, 1941, Serial No. 392,207

1 Claim. (Cl. 138—31)

This invention relates to hydraulic drives for various machines, and has particular advantage in drives for injection molding machines.

Due to the high pressures required in plastic molding machines, which are often about 30,000 pounds per square inch, resort is frequently had to hydraulic systems for the simple and economical transmission of power, especially to the injector power cylinder.

A serious drawback in the use of such hydraulic systems has been the fact that the pump required had to be of large size, which is a condition that is inconsistent with the practical use of high pressures, because of the cost of the installation and the excessive use of power. A molding machine operates quite rapidly, and of course the injector power cylinder is of relatively large area and hence volume.

In the endeavor to overcome this difficulty, it has been proposed to use accumulators of liquid under pressure, charged during the time while the plastic was injecting. But this expedient led to other difficulties as follows:

1. Because the accumulator was loaded by a spring, the discharge pressure of the accumulator was variable. Although this powerful spring was capable of causing a high liquid pressure, the unit pressure was limited by that of the pump and rapidly fell as the injector power cylinder expanded. Hence the injector action piston hesitated during the ejector stroke. During that hesitation, the plastic solidified in whole or in part in the die, and therefore the die could not be wholly filled and the article was defective.

2. Because the plastic contracts during solidification, the full pressure must be maintained to prevent or minimize blow holes and other defects. Since a positive pressure pump such as is used for high pressure has a fixed capacity, the continued operation of the pump after the injector power cylinder was full, placed an unusual strain on the pump; nor could the flow from the pump be maintained without loss in pressure on the power cylinder, since a variation of a very small quantity of liquid would cause a great difference in pressure. And as already seen, the accumulator could not be relied upon because its pressure would be low at the time that the injection of the plastic occurred.

It is therefore an object of the invention to provide an hydraulically actuated plastic injection molding machine having improved means for accumulating a fluid, such as a liquid, and for causing the same to be fed at constant pressure equal to that of the pump.

Another object of the invention is to furnish such a machine having improved means such that the full pressure shall be maintained in a practical manner during the follow-up of the injector piston, while the plastic begins to set.

Another object of the invention is to provide such a machine having improved means whereby the pump is in constant operation without undue strain, and causes a constant uniform injection pressure which is prolonged during the follow-up.

Another object of the invention is to provide such a machine having an improved cycle of operation adapted for high speed operation.

Another object of the invention is the provision of a device of very simple character and improved structure whereby power is transmitted to and fro between two points at one of which the pressure is variable while at the other the pressure is always constant.

In the drawing:

Figure 1 is a schematic view showing a system embodying the invention.

Fig. 2 is a view in elevation with parts in section showing an embodiment of the invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a system embodying the invention and which is best exemplified by an injection machine for molding plastics in a die. Any die 11 may comprise a relatively fixed die member 12 and a relatively movable die member 13. For closing the die 11, an actuator such as a cylinder 14 may be provided, having a piston 15 connected as at 16 to the die member 13. After the die 11 is closed, injection of the plastic thereinto may be caused by any suitable means, preferably a heated cylinder 17 for melting the plastic, and having therein a piston 18 for causing a measured charge of the plastic to be injected from the cylinder 17 into the closed die 11. Retraction of the piston 18 begins before the die begins to open. For causing reciprocation of the piston 18, or at least the power stroke thereof, a cylinder 19 is provided having a piston 20 that is connected to the piston 18.

For operation of the cylinders 14 and 19, a suitable pressure source such as a pump 21 is provided which is preferably in continuous operation and is of the positive pressure type. This pump 21 obtains its fluid, preferably a liquid such as oil, from a reservoir 22 and discharges the same into a pipe line 23, 24, 25 and 26. The pipe lines 25 and 26 lead to any suitable multi-way valve devices 27, 28. From the device 27, extend the pipe branches 27a and 27b to the cylinder 14 for respective projection and retraction of the piston 15. Similar reversible action of the piston 20 is caused by the branch pipes 28a and 28b for respective projection and retraction. It is thus seen that a primary function of the valve devices 27, 28 is purely directional. These valve devices may be controlled in any suitable manner which is conventional and hence not shown; it will suffice to mention that they may be operated by so-called pilot controls, which in turn may be actuated manually or automatically in suitably timed relation according to the timing of the pistons 16 and 20.

The pipe lines 24, 25 and 26 are in communication with a fluid accumulator 29 of an expansible-collapsible type, preferably one which is capable of operation at constant pressure to maintain the simplicity of the means which controls the accumulator. Engaging or coacting with the accumulator is a power storage means 30 which is capable of storing power at a varying and hence increased pressure, so that the power storage means is adapted to be highly compact and to require a minimum of space. The coaction between the accumulator 29 and the power storage means 30 is such that there is a flow of power between the two such that a constant pressure in 29 causes a build up of power at an increasing pressure in 30; and then the flow of power from 30 to 29 causes the latter to release the power to the system 10 at a relatively constant pressure. Various structures may be used for this purpose, one of which is hereinafter described.

Between the pipes 23 and 24 is placed a valve control device 31, from which a by-pass 32 for the pump 21 leads to the reservoir 22.

In operation, when the system 10 is started up, the valve devices 27 and 28 are preferably in closed position, and the valve device 31 is in a position to close the by-pass 32. Hence the pump charges the accumulator 29 and therefore the power storage means 30 and fills with pressure the pipe lines 25 and 26. Now the cycle begins, with a movement of the valve device 27 to cause the pressure to flow through 27a to close the die 11, followed by a movement of the valve device 28 to cause pressure to flow through 28a to cause the plunger 18 to advance and inject a charge of plastic into the closed die 11. During these operations of the cylinders 14 and 19, the capacity of the pump 21 is supplemented by the accumulator 29 and constant pressure by the accumulator 29 and power storage means 30. Hence there is a wholly uniform advance of the pistons 20 and 18, with no hesitation or wavering such as would occur if the pressure from the accumulator were to drop. Thus there can be no incomplete or premature setting of plastic in the die 11, which would prevent complete loading of the die and result in the molding of a defective product. Sufficient capacity is afforded, although the cylinder 19 is relatively large due to the size of the piston 20 for the extremely high injection pressure required. The continuous uniform high pressure afforded by the accumulator and pump is further available for the follow-up injection of plastic into the die, which occurs due to contraction of the plastic as the same begins to set. Such follow-up must be had at the same high pressure as the main injection stroke. Thus blowholes and other defects in the molded product are avoided or at least diminished.

During the cycle, the constantly operating pump begins feeding pressure to the accumulator while the plastic is setting in the die 11. The cylinders 14, 19 are full, and hence the entire capacity of the pump is available to refill the accumulator 29. Nevertheless the pump pressure simultaneously acts without any diminution upon the cylinders 14 and 19. This is due to the fact that the accumulator-storage means combination interposes a relatively uniform constant resistance to the pump pressure, as will be evident. As soon as the accumulator 29 has become fully expanded, the valve device 31 becomes suitably responsive to the accumulator, as by being mechanically tripped or moved by the expanded accumulator, and hence closes the pipe line 24 and forms a communication between the lines 23 and 32 to by-pass the pump pressure to the tank. Should there be any leak in the system which would cause the accumulator to collapse even slightly, the valve device 31 automatically returns to its previous position to cause the accumulator to be again charged up by the pump.

Upon completion of the setting of the plastic, any timing device or manual controls (not shown) operate first the valve device 28, then the valve device 27 for a reverse or retraction movement of the respective pistons 20 and 15, as hereinbefore mentioned. When this occurs, the accumulator 29 begins to supply pressure to the opposite faces of these pistons, and as the accumulator begins to collapse, the valve device returns to its normal position to close the by-pass 32 and cause the pump 21 to feed pressure to the pipe lines 24, 25 and 26 to act in conjunction with the accumulator for causing retraction of the pistons 15 and 20. The liquid at the opposite sides of these pistons may be drained off in any suitable manner to the reservoir 22, as by the pipe lines 33, 34 which connect into the valve devices 27, 28 to be controlled thereby. Thus these valve devices may be termed four-way valves. During the dwell caused in removing the molded article, the cylinders 14 and 19 being again full, the entire capacity of the pump 21 is available to reload to accumulator 29, whereupon the valve device 31 diverts the pump capacity through the by-pass 32 to the reservoir 22 as before. This completes the cycle.

In Fig. 2 is shown a device 35 embodying the invention according to one possible exemplification thereof. Here the accumulator may comprise a cylinder 36 and a piston 37 having a hollow connecting rod 38 which extends through the piston. At its upper end the connecting rod is connected into a fixed bearing 39 which affords a swivel connection to the pipe line 24. The lower end of the cylinder is pivotally connected at 40 to a bell crank lever 41 having a fixed pivot at 42. Accordingly, the piston and cylinder form a means which is expansible and collapsible by oscillation between the fixed points 39 and 42, with the cylinder and piston mutually guiding each other; although additional guide means for the cylinder may be provided at 39 if desired. The other end of the bell crank forms a pivot 43 for a head 44 which co-operates with a head 45 having a fixed pivot 46. Acting between the heads 44 and 45 is a powerful expansion coil spring 47, which may be guided to maintain it in a straight line as by rods 48 and in any other suitable manner not shown.

The bell crank 41 provides arms 49, 50, which in conjunction with the pivotally mounted accumulator 29 and power storage means 30, arranged as shown, form a leverage system such that the sum of the moments about the fixed pivot 42 are equal to zero, according to the well known principle of physics. In other words, assuming that constant pressure is being fed to the accumulator, the leverage of the bell crank 41 changes as the spring 47 is compressed. Thus the constant force exerted by the expanding accumulator is capable of exerting an increasing force on the spring; and, in reverse, a decreasing force caused by the expanding spring, exerts a constant force on the accumulator. In actual practice, moments that are exactly equal cannot be realized without the use of cams or eccentrics. But these would add so much expense and friction as not to be worthwhile. With the exemplification herein shown to scale, the moments at different points have been computed, and the installation designed so that the moments are approximately equal. The maximum variation need not exceed more than ten percent.

In operation, the fluid pressure passes through the hollow rod 38 and causes relative movement between the piston 37 and the cylinder 36, causing movement of the bell crank 41 and hence compression of the spring 47. The maximum movement is indicated by the dotted lines. When the fluid pressure is released through the hollow rod 38, the reverse movement occurs under the power stored in the spring 47. The control 31 may be responsive to any moving element such as the cylinder 36 or the connecting rod 38 or even the bearing 39, for its intended operation.

In principle, the spring 47 is the equivalent of any resilient means, and even of a gas or other cushioning means which stores power by compression. Obviously, the system 10 can be operated by gas or liquid, the latter being preferred because it is positive and occupies little space.

I claim:

A device whereby power can be resiliently stored so as to be available at relatively constant pressure substantially without loss, including an expansible-collapsible accumulator for fluid under pressure pivotally mounted at one end, a resiliently acting power storage means pivotally mounted at one end, and means having a relatively fixed pivot pivotally connected to the other ends of the accumulator and power storage means and having the characteristic that the recurrent variable moments of the accumulator and power storage means about said relatively fixed pivot are approximately equal in different operative pivotal positions of the accumulator and power storage means.

PETER DE MATTIA.